US010473762B2

(12) United States Patent
Lilja

(10) Patent No.: US 10,473,762 B2
(45) Date of Patent: Nov. 12, 2019

(54) WIRELESS RADIO MODULE

(71) Applicant: Microsoft Technology Licensing, LLC, Redmond, WA (US)

(72) Inventor: Juha Lilja, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 15/237,223

(22) Filed: Aug. 15, 2016

(65) Prior Publication Data
US 2018/0045815 A1 Feb. 15, 2018

(51) Int. Cl.
| G01S 7/41 | (2006.01) |
| G08B 21/06 | (2006.01) |
| G01S 7/00 | (2006.01) |
| G01S 13/88 | (2006.01) |
| G01S 13/93 | (2006.01) |
| G01S 13/00 | (2006.01) |

(52) U.S. Cl.
CPC ............ G01S 7/415 (2013.01); G01S 7/006 (2013.01); G01S 13/886 (2013.01); G08B 21/06 (2013.01); *G01S 13/931* (2013.01); *G01S 2013/936* (2013.01)

(58) Field of Classification Search
USPC .......................... 180/271, 272; 340/575, 576
See application file for complete search history.

(56) References Cited

U.S. PATENT DOCUMENTS

| 3,277,489 A | * | 10/1966 | Blaisdell | H01Q 3/32 333/125 |
| 4,085,740 A | * | 4/1978 | Allen, Jr. | A61B 5/0507 600/500 |
| 4,135,131 A | * | 1/1979 | Larsen | A61B 5/05 324/615 |
| 4,513,748 A | * | 4/1985 | Nowogrodzki | A61B 5/0507 600/430 |
| 4,991,585 A | * | 2/1991 | Mawhinney | A61B 5/0507 340/573.1 |

(Continued)

FOREIGN PATENT DOCUMENTS

| CN | 102801448 A | 11/2012 | |
| GB | 2349759 A | * 11/2000 | ............. A61B 5/021 |

(Continued)

OTHER PUBLICATIONS

D. T. Petkie et al., "Millimeter Wave Radar for Remote Measurement of Vital Signs"; IEEE, Piscataway, NJ, USA; copyright in the year 2009; publication No. 978-1-4244-2871-7/09/$25.00. (Year: 2009).*

(Continued)

Primary Examiner — Bernarr E Gregory

(57) ABSTRACT

According to one aspect, there is provided a wireless radio module comprising a millimeter wave wireless communication transceiver configured to output radar signals for physiological measurement, a millimeter wave antenna array connected to the millimeter wave wireless communication transceiver and configured to transmit the radar signals and to receive reflected radar signals, and a processing unit configured to analyze the received reflected radar signals to determine changes in a spectrum reflecting at least one of heart rate or respiration.

20 Claims, 6 Drawing Sheets

(56) References Cited

U.S. PATENT DOCUMENTS

| | | | | |
|---|---|---|---|---|
| 5,073,782 | A * | 12/1991 | Huguenin | G01S 7/41 250/332 |
| 5,600,253 | A | 2/1997 | Cohen et al. | |
| 5,677,697 | A * | 10/1997 | Lee | G01S 7/282 342/368 |
| 5,760,687 | A * | 6/1998 | Cousy | G01S 7/415 340/554 |
| 5,807,257 | A * | 9/1998 | Bridges | A61B 5/05 600/430 |
| 8,583,046 | B2 | 11/2013 | Rofougaran | |
| 8,725,311 | B1 * | 5/2014 | Breed | G08B 21/06 600/300 |
| 8,814,805 | B2 * | 8/2014 | Lin | A61B 5/05 600/534 |
| 8,884,813 | B2 * | 11/2014 | Bangera | A61B 5/0507 340/573.1 |
| 2001/0042977 | A1 * | 11/2001 | Breed | B60N 2/0232 280/735 |
| 2002/0121981 | A1 * | 9/2002 | Munch | G08B 21/06 340/576 |
| 2003/0136600 | A1 * | 7/2003 | Breed | G01S 7/417 180/272 |
| 2005/0073424 | A1 * | 4/2005 | Ruoss | A61B 5/18 340/686.6 |
| 2006/0058606 | A1 * | 3/2006 | Davis | A61B 5/05 600/407 |
| 2006/0220915 | A1 * | 10/2006 | Bauer | A61B 5/18 340/945 |
| 2006/0290516 | A1 * | 12/2006 | Muehlsteff | A61B 5/0265 340/573.1 |
| 2008/0074307 | A1 * | 3/2008 | Boric-Lubecke | A61B 5/0205 342/28 |
| 2010/0152600 | A1 * | 6/2010 | Droitcour | A61B 5/05 600/534 |
| 2013/0096396 | A1 * | 4/2013 | Riedel | A61B 5/0205 600/301 |
| 2015/0157239 | A1 * | 6/2015 | Rissacher | A61B 5/0402 600/407 |
| 2015/0305070 | A1 | 10/2015 | Ahmad | |

FOREIGN PATENT DOCUMENTS

| | | | | |
|---|---|---|---|---|
| WO | WO2004/057367 | A1 * | 7/2004 | A61B 5/024 |
| WO | WO2006/064073 | A1 * | 6/2006 | B60K 28/066 |
| WO | WO2007/010460 | A2 * | 1/2007 | A61B 5/021 |
| WO | WO2008/069337 | A1 * | 6/2008 | A61B 5/024 |
| WO | WO2009/009690 | A2 * | 1/2009 | A61B 5/05 |

OTHER PUBLICATIONS

I. V. Mikhelson et al, "Remote Sensing of Heart Rate and Patterns of Respiration on a Stationary Subject Using 94-GHz Millimeter-Wave Interferometry"; IEEE Transactions on Biomedical Engineering; vol. 58, No. 6; Jun. 2011; pp. 1671-1677; IEEE, Piscataway, NJ, USA. (Year: 2011).*

S. Bakhtiari et al., "A Real-time Heart Rate Analysis for a Remote Millimeter Wave I-Q Sensor"; IEEE Transactions on Biomedical Engineering; vol. 58, No. 6; Jun. 2011; pp. 1839-1845; IEEE, Piscataway, NJ, USA. (Year: 2011).*
S. Bakhtiari et al., "Compact Millimeter-Wave Sensor for Remote Monitoring of Vital Signs"; IEEE Transactions on Instrumentation and Measurement; vol. 61, No. 3; Mar. 2012; pp. 830-841; IEEE, Piscataway, NJ, USA. (Year: 2012).*
"Wi-Fi signal Used to Track Moving Humans—Even Behind Walls", Published on: Jul. 6, 2013, 5 pages, Available at: http://www.kurzweilai.net/wi-fi-signal-used-to-track-moving-humans-even-behind-walls.
Hambling, David, "Seeing Through Walls with a Wireless Router", Published on: Aug. 2, 2012, 6 pages, Available at: http://www.popsci.com/technology/article/2012-07/seeing-through-walls-wireless-router.
Yang, et al., "Sensor-Assisted Codebook-based Beamforming for Mobility Management in 60 GHz WLANs", In Proceedings of Maritime & Arctic Security & Safety Conference, Oct. 13, 2015, pp. 1-9.
Caekenberghe, Koen A. P. A. Van, "RF MEMS Technology for Millimeter-Wave Radar Sensors", In Doctoral dissertation of University of Michigan, Dec. 2008, 125 pages.
Frenzel, Lou, "Millimeter Waves Will Expand the Wireless Future", Published on: Mar. 6, 2013, 10 pages, Available at: http://electronicdesign.com/communications/millimeter-waves-will-expand-wireless-future.
Hammerschmidt, Christoph, "Google Gesture Sensor Uses 60 GHz Radar", Published on: Jun. 1, 2015, 2 pages, Available at: http://www.analog-eetimes.com/en/google-gesture-sensor-uses-60-ghz-radar.html?cmp_id=7&news_id=222907323.
Kinzie, Nicola Jean, "Ultra-Wideband Pulse Doppler Radar for Short-Range Targets", In PhD Thesis of University of Colorado, Dec. 2011, 305 pages.
Sarkas, Ioannis, "Circuit and System Design for mm-wave Radio and Radar Applications", In PhD Thesis of University of Toronto, Aug. 13, 2013, 234 pages.
Muthukrishnan, et al., "Sensing Motion Using Spectral and Spatial Analysis of WLAN RSSI", In Proceedings of the 2nd European conference on Smart sensing and context, Oct. 23, 2007, 16 pages.
Daniels, et al., "60 GHz Wireless: Up Close and Personal", In Journal of IEEE Microwave Magazine, Dec. 2010, pp. 44-50.
Afshar, Bagher, "Millimeter-Wave Circuits for 60GHz and Beyond", In Technical Report of UCB/EECS-2010-113, Aug. 12, 2010, 161 pages.
Howarth, Dan, "Google's Project Soli Turns Hand Gestures into Digital Controls Using Radar", Published on: Jun. 2, 2015. 33 pages, Available at: http://www.dezeen.com/2015/06/02/google-project-soli-interaction-sensor-radar-hand-gestures-digital-control-electronic-devices/.
Pu, et al., "Whole-Home Gesture Recognition Using Wireless Signals", In Proceedings of the 19th annual international conference on Mobile computing & networking, Sep. 30, 2013, 12 pages.
Zhu, et al., "Reusing 60GHz Radios for Mobile Radar Imaging", In Proceedings of the 21lst annual international conference on Mobile computing & networking, Sep. 7, 2015, 14 pages.

* cited by examiner

WIRELESS RADIO MODULE

BACKGROUND

Wireless communication apparatuses, for example, tablet computers and smart phones comprise a variety of sensors for implementing specific sensing functionalities. For example, a proximity sensor can be used to determine whether a user is close to his device or not. When separate sensors are used for various sensing functionalities, this also requires space for the sensor components in a wireless communication apparatus or needs separate and external sensing devices connected to a wireless communication apparatus.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a wireless radio module is provided. The wireless radio module comprises a millimeter wave wireless communication transceiver configured to output radar signals for physiological measurement, a millimeter wave antenna array connected to the millimeter wave wireless communication transceiver and configured to transmit the radar signals and to receive reflected radar signals, and a processing unit configured to analyze the received reflected radar signals to determine changes in a spectrum reflecting at least one of heart rate or respiration.

In another embodiment, a wireless communication apparatus is provided. The wireless communication apparatus comprises a wireless radio module comprising a millimeter wave wireless communication transceiver configured to output radar signals for physiological measurement and a millimeter wave antenna array connected to the millimeter wave wireless communication transceiver and configured to transmit the radar signals and to receive reflected radar signals; and a processing unit configured to analyze the received reflected radar signals to determine changes in a spectrum reflecting at least one of heart rate or respiration.

In another embodiment, a vehicle is provided. The vehicle comprises a millimeter wave wireless communication transceiver configured to output radar signals for physiological measurement, a millimeter wave antenna array connected to the millimeter wave wireless communication transceiver and configured to transmit the radar signals and to receive reflected radar signals, and a processing unit configured to analyze the received reflected radar signals to determine changes in a spectrum reflecting at least one of heart rate or respiration, to determine based on the analysis that a physiological state relating to a driver of the vehicle fulfills at least one alert triggering condition, and to cause initiation of an alert.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

In wireless communication apparatuses, for example, in tablet computers and smart phones, separate sensors or additional apparatus components are used to enable a specific functionality relating to the apparatus. When new sensors or additional apparatus components are used for specific sensing functionalities, this also requires space for the new sensors or components in a wireless communication apparatus.

In at least some embodiments a solution is provided where existing apparatus components can be used to achieve sensing the same or similar functionality that would normally require the use of apparatus components required specifically for this purpose.

In at least some embodiments a solution is provided where a wireless radio module, for example, a 60 Ghz wireless connectivity module, for example, in accordance with WiGig specifications already existing in a wireless communication apparatus can be used to output radar signals for physiological measurement purposes. The received reflected radar signals are then analyzed to determine changes in a spectrum reflecting heart rate or respiration or both of them.

Further, in at least some embodiments a solution is provided where a wireless communication apparatus, for example, a smart phone or wireless communication apparatus integrated into a vehicle, for example, a car can be used for determining a physiological state of a user. A millimeter wave wireless communication transceiver is configured to output radar signals for physiological measurement, and a millimeter wave antenna array connected to the millimeter wave wireless communication transceiver is configured to transmit the radar signals and to receive reflected radar signals. The received reflected radar signals are then analyzed with a processing unit to determine changes in a spectrum reflecting heart rate or respiration of a user or both of them.

Figure 1:
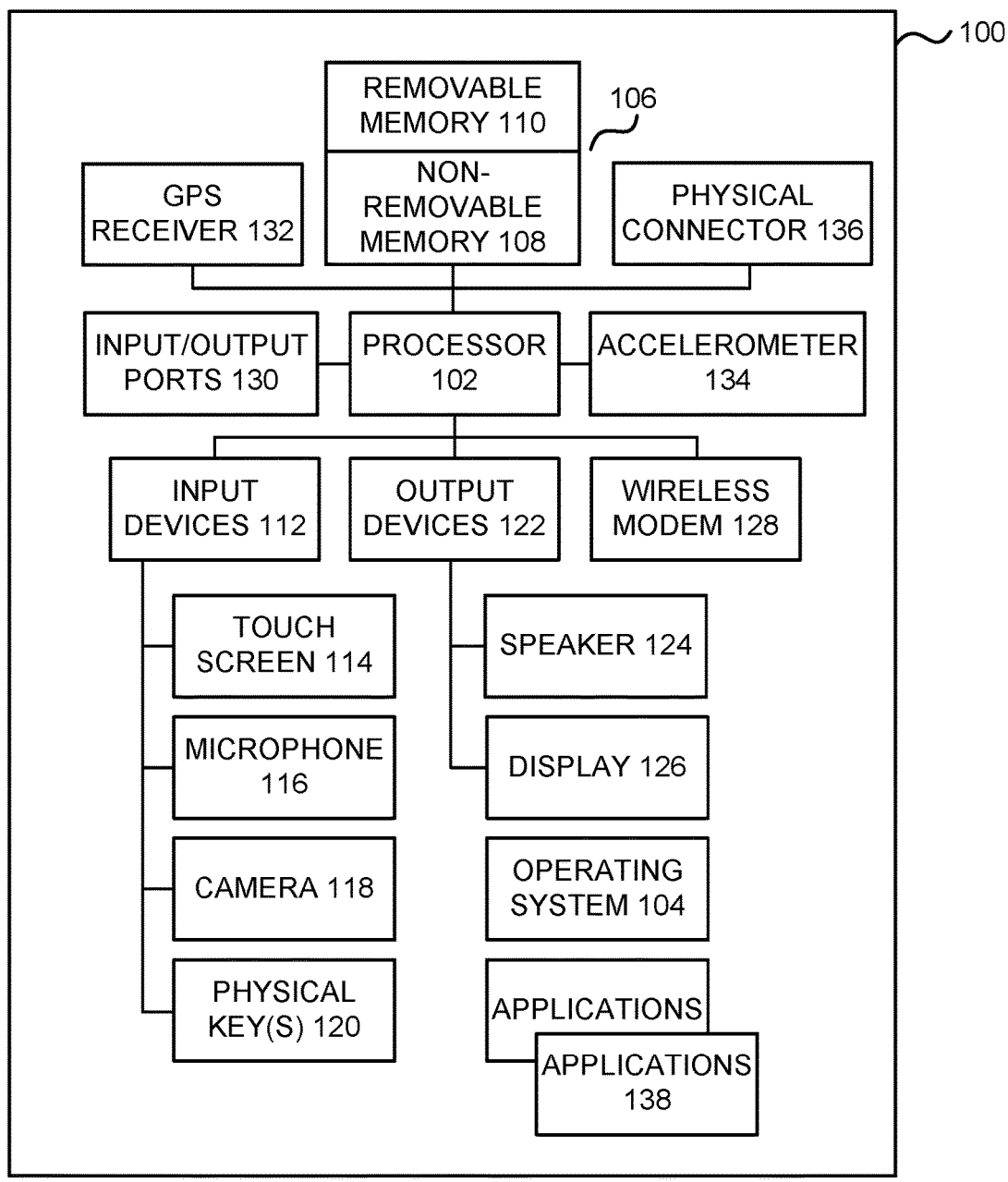
FIG. 1 is a system diagram depicting an apparatus including a variety of optional hardware and software components.

FIG. 1 is a system diagram depicting an apparatus 100 including a variety of optional hardware and software components. Any components in the apparatus may communicate with any other component, although not all connections are shown, for ease of illustration. The apparatus may be any of a variety of computing devices (for example, an electronic meeting room apparatus, a client device, a server in a private or public network etc.) and may allow wireless two-way communications with one or more communications networks, such as a data, cellular or satellite network. The apparatus is, for example, a smart phone, a mobile device, a tablet computer, a gaming console or a laptop computer or any other device comprising a camera or a camera module.

The illustrated apparatus 100 comprises a controller or processor 102 (e.g., signal processor, microprocessor, ASIC, or other control and processing logic circuitry) for performing such tasks as signal coding, data processing, input/output processing, power control, and/or other functions. An operating system 104 controls the allocation and usage of the components of the apparatus 100 and supports for one or more application programs 138.

The illustrated apparatus 100 comprises a memory 106. The memory 106 may include non-removable memory 108 and/or removable memory 110. The non-removable memory 108 may include RAM, ROM, flash memory, a hard disk, or other well-known memory storage technologies. The removable memory 110 may include, for example, a flash memory, or other well-known memory storage technologies, such as "smart cards". The memory 106 may be used for storing data and/or code for running the operating system 104 and the applications 138. Example data may include sound files, video data, or other data sets to be sent to and/or received from one or more network servers or other devices via one or more wired or wireless networks.

The apparatus 100 supports one or more input devices 112, such as a touchscreen 114, microphone 116, a camera or a camera module 118 and/or physical keys or a keyboard 120 and one or more output devices 122, such as a speaker 124 and a display 126. Depending on the apparatus 100, a separate camera module may be used. Alternatively or in addition, the camera may be integrated into another apparatus element, for example, to a circuit board or to a display. Yet in another embodiment, the camera may be an external camera connected to the apparatus 100. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 138 may comprise speech-recognition software as part of a voice user interface that allows a user to operate the apparatus 100 via voice commands. Further, the apparatus 100 may comprise input devices and software that allows for user interaction via a user's spatial gestures, such as detecting and interpreting gestures to provide input to a gaming application.

A wireless modem may be coupled to an antenna (not shown) and can support two-way communications between the processor 102 and external devices, as is well understood in the art. The modem is shown generically and may include a cellular modem for communicating with a mobile communication network and/or other radio-based modems (e.g., BLUETOOTH or Wi-Fi).

The apparatus 100 may further include a gyroscope, at least one input/output port 130, an ambient light sensor, an accelerometer 134, a proximity sensor, and/or a physical connector 136, which can be an Ethernet port, a Universal Serial Bus (USB) port, Institute of Electrical and Electronics Engineers (IEEE) 1394 (FireWire) port, and/or Recommended Standard (RS) 232 port. The illustrated components of the apparatus 100 are not required or all-inclusive, as any components can deleted and other components can be added.

Any combination of the illustrated components disclosed in FIG. 1, for example, at least one of the processor 102, the memory 106 and the wireless modem 128, may constitute means for controlling a millimeter wave wireless communication transceiver to output radar signals for physiological measurement with a millimeter wave antenna array, means for receiving reflected radar signals from a millimeter wave antenna array connected to the millimeter wave wireless communication transceiver and being configured to transmit the radar signals, and means for analyzing the received reflected radar signals to determine changes in a spectrum reflecting at least one of heart rate or respiration of a user, i.e. heart rate or respiration or both of them.

Figure 2:
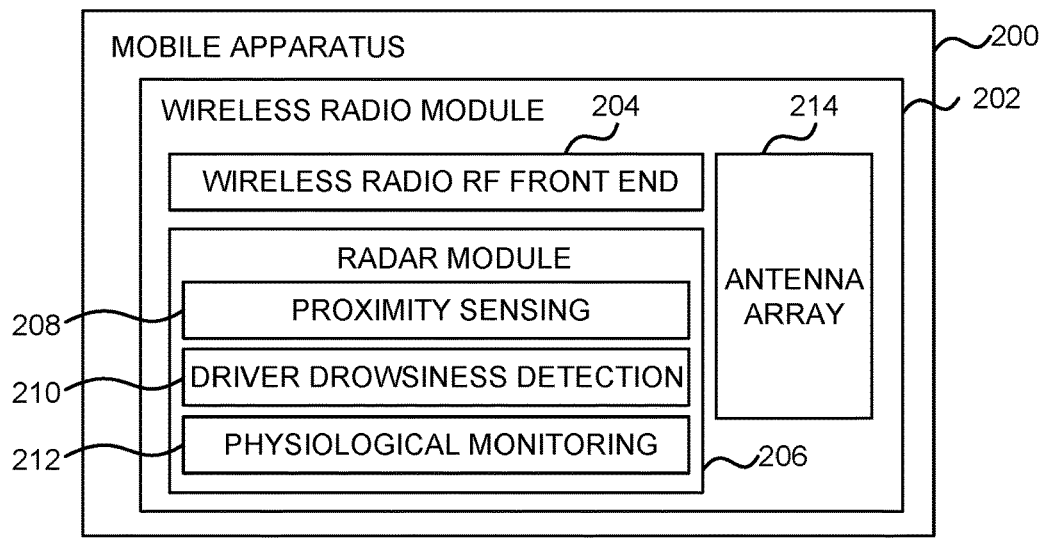
FIG. 2 is a system diagram depicting a mobile apparatus including a variety of hardware components.

FIG. 2 is a system diagram depicting a mobile apparatus 200 including a variety of hardware components. The mobile apparatus 200 comprises a wireless radio module 202 which can be, for example, a 60 Ghz wireless connectivity radio module configured to enable 60 GHz wireless connectivity functionality for the mobile apparatus 200. The mobile apparatus 200 itself may be, for example, a smart phone, a mobile device, a tablet computer, a gaming console or a laptop computer.

The wireless radio module 202 comprises a wireless radio RF front end 204, a radar module 206 and an antenna array 214. The wireless radio RF front end 204 together with the antenna array 214 output radar signals for physiological measurement. The radar module 306 is configured to enable at least one of the following functions: proximity sensing 208, driver drowsiness detection 210 and physiological monitoring of a user. Further, although the radar module 206 is illustrated in FIG. 2 as a separate module within the wireless radio module 202, in another embodiment, the radar module 206 may be implemented outside the wireless radio module 202 and the radar module 206 then controls the wireless radio module 202 to enable at least one of proximity sensing 208, driver drowsiness detection 210 and physiological monitoring 212 of a user.

If the mobile apparatus 200 is used for physiological monitoring, the mobile apparatus 200 may gather physiological data about the user, and a doctor is able to get the physiological data relating to the user immediately via a data connection despite the location of the user. Further, in case of an emergency, rescue personnel may be able to monitor vital signs of a victim when the rescue personnel have not yet arrived at the scene.

Figure 3A:
FIG. 3A illustrates one implementation of a wireless radio module according to one embodiment.
Figure 3B:
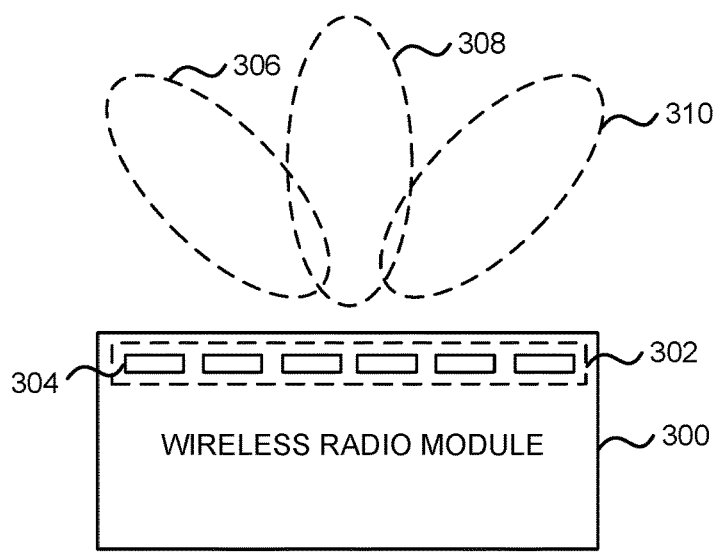
FIG. 3B illustrates a beamforming example of a wireless radio module of FIG. 3A according to another embodiment.

FIG. 3A illustrates one implementation of a wireless radio module 300 according to one embodiment. The wireless radio module 300 comprises an antenna array 302 comprising a plurality of antenna elements 304. The antenna array 302 may be used for antenna beam forming, as illustrated in FIG. 3B by antenna beams 306, 308, 310. The wireless radio module 300 may comprise a control unit configured to provide electronic antenna beam control for the millimeter wave antenna array. The control unit may be configured to configure the antenna beam towards detected heart beat and/or respiration.

If a single antenna or antenna array is used both to transmit a radar signal and to receive a reflected radar signal, a circulator can be used to enable the usage of the single antenna or antenna array.

Figure 3C:
FIG. 3C illustrates another implementation of a wireless radio module according to one embodiment.

FIG. 3C illustrates another implementation of a wireless radio module 312 according to another embodiment. The wireless radio module 312 comprises a first antenna array 314 for transmission and a second antenna array 316 for reception. The first antenna array 314 is configured to send a radar pulse, and the second antenna array 316 is configured to receive a radar pulse that has reflected from an object. The wireless radio module 312 may be a monostatic wireless radio module where both the first antenna array 314 for transmission and the second antenna array 316 for reception locate at the same position. Alternatively, the wireless radio module 312 may be a bistatic wireless radio module where the first antenna array 314 for transmission and the second antenna array 316 for reception locate at a different position.

If two separate antennas or antenna arrays are used, a power divider can be used to divide power between the transmitting antenna array 314 and the receiving antenna array 316.

Figure 3D:
FIG. 3D illustrates another implementation of a wireless radio module according to another embodiment.

FIG. 3D illustrates another implementation of a wireless radio module 318 according to another embodiment. The wireless radio module 318 comprises a first antenna array 322 for transmission. Further, the wireless radio module 318 comprises a second 320 and third 324 antenna array for reception. The first antenna array 322 is used to send a detection pulse (or a radar signal), and the second and third antennas 320, 324 measure a received signal reflected from an object to detect how the object is located in the vicinity of an apparatus comprising the wireless radio module 318. This information can be used, for example, to control antennas to steer the radiation patters of the first antenna array 322 away from a human body in order to improve reception quality.

The embodiment illustrated in FIG. 3D also enables controlling a wireless communication apparatus comprising the wireless radio module 318, for example, by hovering a finger above the apparatus.

Figure 4:
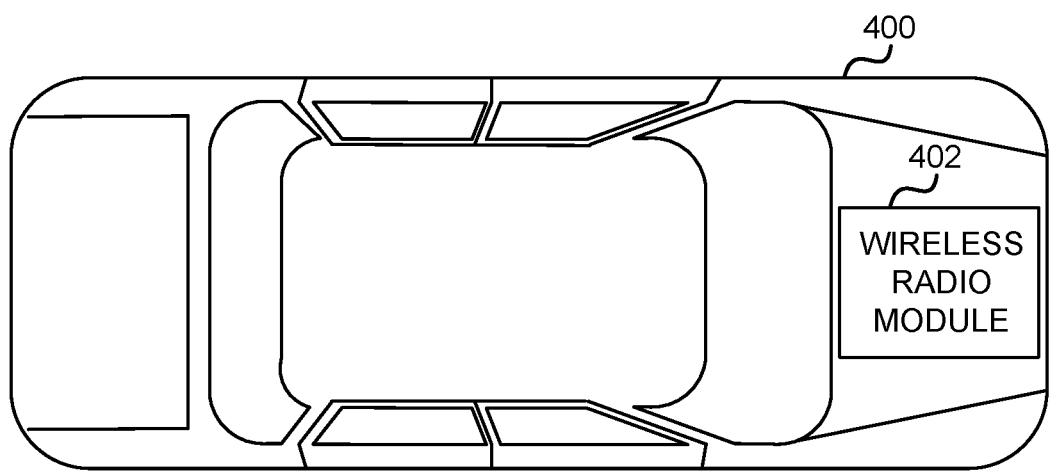
FIG. 4 illustrates a vehicle comprising a wireless radio module according to one embodiment.

FIG. 4 illustrates a vehicle 400 comprising a wireless radio module 402 according to one embodiment. The wireless radio module 402 may be any of the wireless radio modules illustrated in FIG. 2 and FIGS. 3A-3D. The wireless radio module 402 may an integrated module part of a driver information system of the vehicle 400. Further, although FIG. 4 illustrates a passenger car as an example, the vehicle may be of any other car type, for example, a truck, a bus etc.

In one embodiment, the wireless radio module 400 comprises a millimeter wave wireless communication transceiver configured to output radar signals for physiological measurement and a millimeter wave antenna array connected to the millimeter wave wireless communication transceiver and configured to transmit the radar signals and to receive reflected radar signals. In one embodiment, the wireless radio module 402 further comprises a processing unit configured to analyze the received reflected radar signals to determine changes in a spectrum reflecting at least one of heart rate or respiration, to determine based on the analysis that a physiological state relating to a driver of the vehicle fulfills at least one alert triggering condition, and to cause initiation of an alert.

The wireless radio module 402 may be arranged in the vehicle 400 in a location where there is an unobstructed line of sight between the antenna array of the wireless radio module and a driver of the vehicle 400. This ensures an unobstructed travel path for the radar signals and thus improves measurement results.

In on embodiment, when the driver of the vehicle 400 activates a navigation application of the vehicle 400, this also initiates output of the radar signals for physiological measurement of the driver. In another embodiment, output of the radar signals is active always when the vehicle 400 is moving. In another embodiment, the user has to manually activate the physiological measurement function via the driver information system of the vehicle 400.

In one embodiment, the at least one alert triggering condition comprises determining that breathing of the driver slows down for a predetermined time. This means that if the breathing of the driver slows down and remains the essentially the same for the predetermined time, this may be regarded as an indication that the driver is about to fall asleep. Alternatively or in addition, the at least one alert triggering condition comprises determining that heartbeat of the driver becomes regular for a predetermined time. Again, this may be regarded as an indication that the driver is about to fall asleep. The predetermined time is selected so that it is long enough in order not to initiate false alerts but at the same time short enough in order to detect in time that the driver is falling asleep. The alert may comprise one or more signals to alert the driver, for example, an audible alert, a vibrating alert with a steering wheel etc.

Figure 5A:
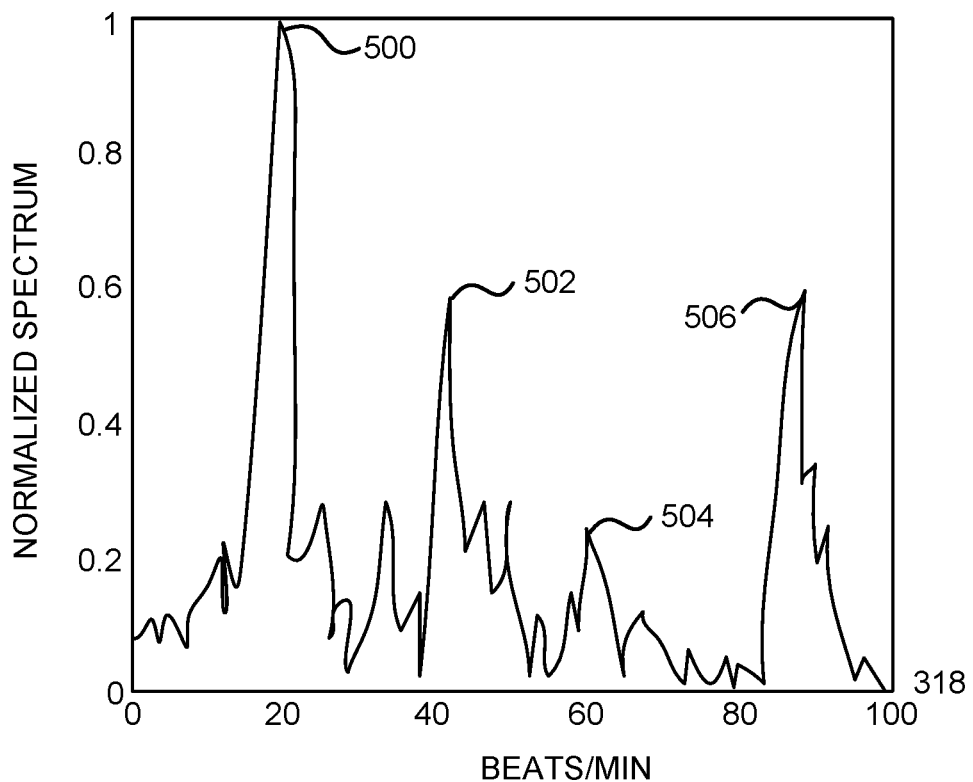
FIG. 5A is a graph illustrating changes in a spectrum reflecting user heart rate and respiration according to one embodiment.

FIG. 5A is a graph illustrating changes in a normalized spectrum reflecting user heart rate and respiration according to one embodiment. An amplitude peak 500 in the spectrum discloses the breathing fundamental, an amplitude peak 502 discloses the $2^{nd}$ harmonic of the breathing, and an amplitude peak 504 discloses the $3^{rd}$ harmonic of the breathing. A peak 506 discloses the heartbeat value for a driver. Based on the spectrum it is possible to determine when a driver of a vehicle is about to fall asleep or to determine physiological parameters relating to a user.

Figure 5B:
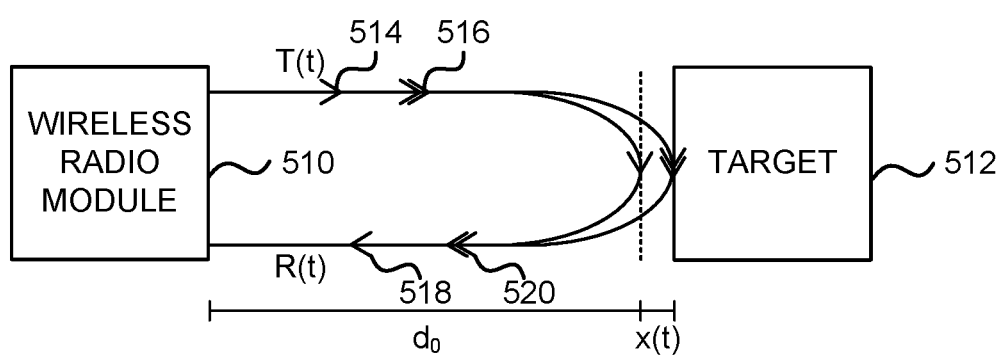
FIG. 5B is a diagram illustrating transmitted and reflected radar signals according to one embodiment.

FIG. 5B is a diagram illustrating transmitted and reflected radar signals according to one embodiment. The spectrum illustrated in FIG. 5A may be provided after analysis of the transmitted and reflected signals, as illustrated in FIG. 5B.

A wireless radio module 510 comprises a millimeter wave wireless communication transceiver configured to output radar signals 514, 516 for physiological measurement and a millimeter wave antenna array connected to the millimeter wave wireless communication transceiver and configured to transmit the radar signals and to receive reflected radar signals. The transmitted signals T(t) 514, 516 can be expressed by the following equation:

$$T(t) = \cos[2\pi ft + \phi(t)]$$

The reflected signals R(t) 518,520 can be expressed by the following equation:

$$R(t) \approx \cos\left[2\pi ft - \frac{4\pi d_0}{\lambda} - \frac{4\pi v(t)}{\lambda} + \phi\left(t - \frac{2d_0}{c}\right)\right]$$

where $$\frac{4\pi d_0}{\lambda}$$

is an antenna to target round trip delay;

$$\frac{4\pi v(t)}{\lambda}$$

is phase modulation due to chest movement of a human target 512;

x(t) is the distance that the target's chest moves during respiration; and $d_0$ is the distance between the wireless radio module 510 and the human target 512.

Since the chest of the target moves periodically, this causes a phase shift in the reflected signals R(t). In order to detect heart rate and/or respiration based on the reflected signals R(t), the received signals R(t) may be mixed with part of the transmitted signals T(t). Thus, T(t)×R(t) provides a baseband signal B(t) which can be expressed with the following equation:

$$B(t) \approx \cos\left[\frac{4\pi d_0}{\lambda} + \frac{4\pi x(t)}{\lambda} + \theta_0 + \Delta\phi\right]$$

In the equation, $$\frac{4\pi d_0}{\lambda} + \theta_0$$

can be expressed as 90°, 270° etc.

$$\frac{4\pi x(t)}{\lambda}$$

is small as x(t)<<λ. The impact of Δϕ in the equation is negligible. Thus, the overall approximation provides the following result:

$$B(t) = \sin\left[\frac{4\pi x(t)}{\lambda}\right] \cong \frac{4\pi x(t)}{\lambda}.$$

Figure 6:
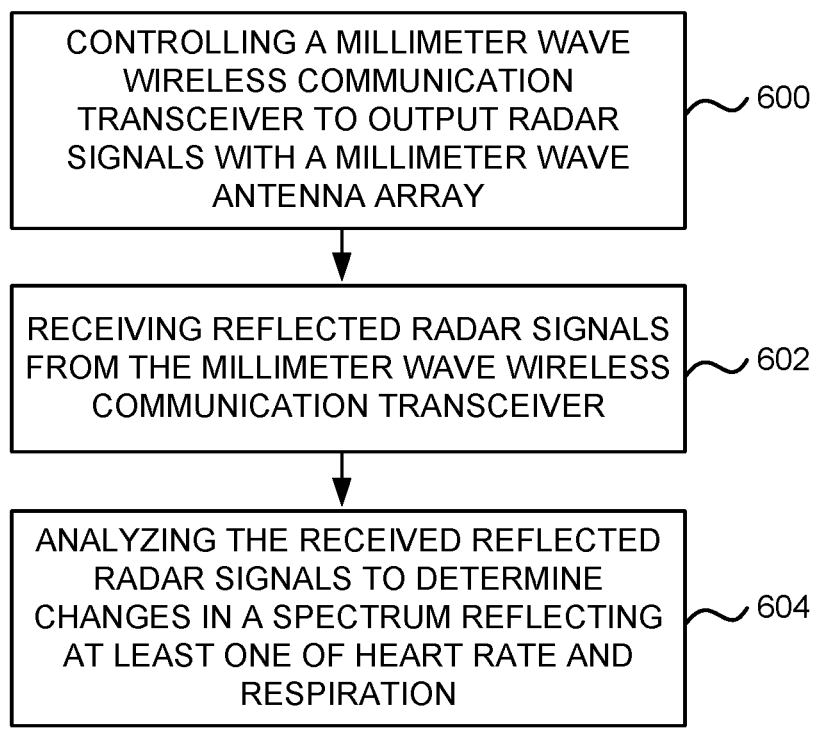
FIG. 6 illustrates a flow diagram of a method for determining a physiological state of a user according to one embodiment.

FIG. 6 illustrates a flow diagram of a method for determining a physiological state of a user according to one embodiment. The method may be performed by a wireless communication apparatus, for example, a smart phone or by a vehicle comprising a wireless radio module.

At 600 a millimeter wave wireless communication transceiver is controlled to output radar signals for physiological measurement of a user with a millimeter wave antenna array.

At 602 reflected radar signals are received from the millimeter wave wireless communication transceiver.

At 604 the received reflected radar signals are analyzed to determine changes in a spectrum reflecting at least one of heart rate or respiration. Thus, it is possible to determine a physiological state of a user with a wireless communication apparatus or with a vehicle including an integrated wireless communication apparatus or module.

Figure 7:
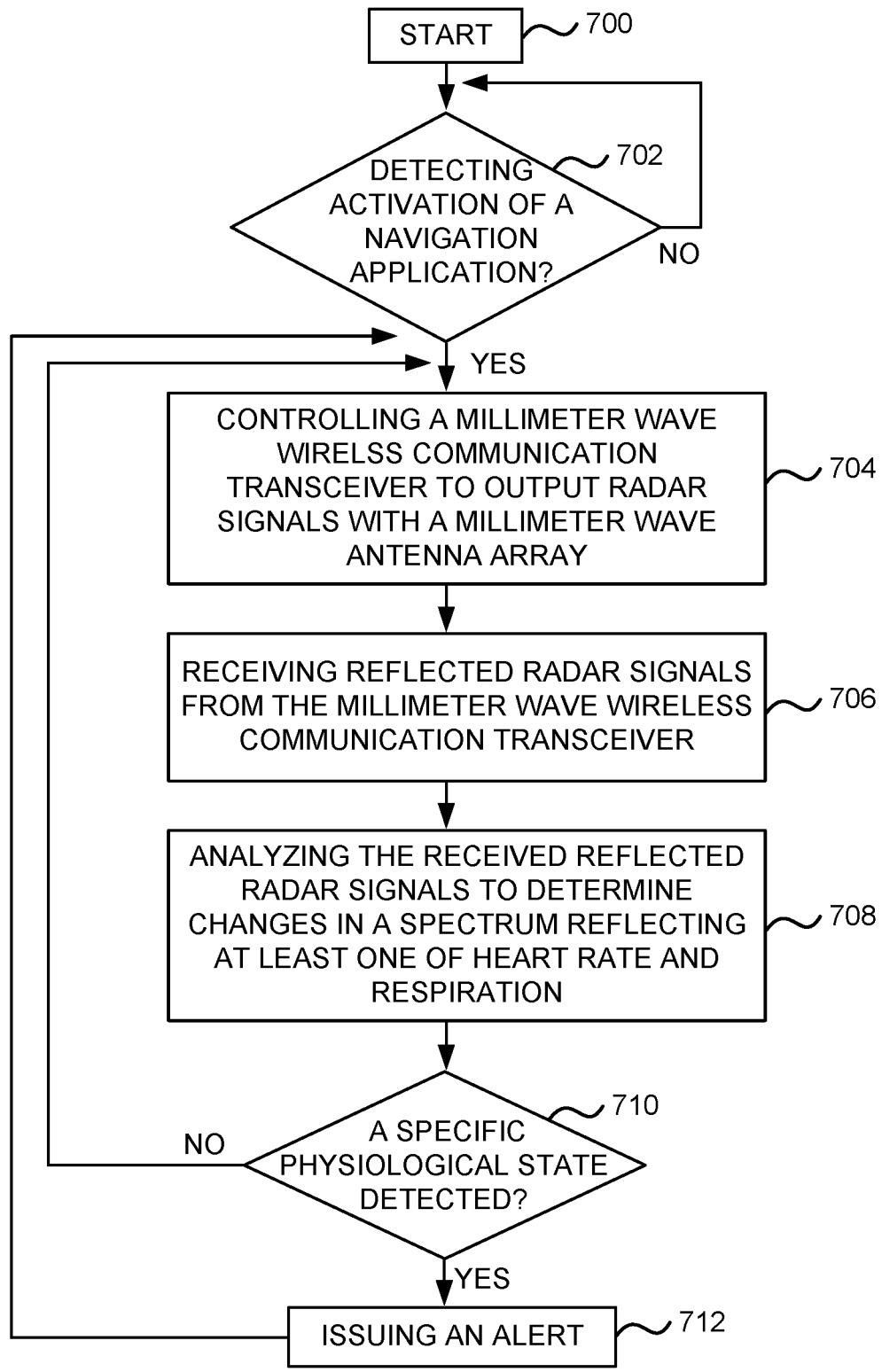
FIG. 7 illustrates a flow diagram of a method for determining a physiological state relating to a user according to one embodiment.

FIG. 7 illustrates a flow diagram of a method for determining a physiological state relating to a user according to one embodiment. The method may be performed by a wireless communication apparatus, for example, a smart phone or by a vehicle comprising a wireless radio module.

The method starts at 700 to determine at 702 whether a navigation application has been activated. The activation of the navigation application acts as a trigger for initiating output of radar signals. If the activation is not detected, the process returns back and continues the detection process. Instead of detecting initiation of a navigation application, the output of the radar signals may be automatically initiated when the vehicle starts to move or exceeds a predetermined speed threshold. If the activation is detected, at 704 a millimeter wave wireless communication transceiver is controlled to output radar signals with a millimeter wave antenna array. The millimeter wave wireless transceiver uses, for example, 60 Ghz wireless connectivity radio transmission.

At 706 reflected radar signals are received from the millimeter wave wireless communication transceiver. At 708 the received reflected radar signals are analyzed to determine changes in a spectrum reflecting at least one of heart rate or respiration. The output radar signals reflected from a human body and the reflected signals include characteristics based on which it is possible to determine a physiological state relating to a driver.

At 710 it is determined whether a specific physiological state is detected. The specific physiological state refers, for example, to the fact that based on the analysis it is determined that that breathing of a user slows down for a predetermined time. This provides an indication that the driver is about to fall asleep. Alternatively or in addition, the specific physiological state may also refer to the fact that based on the analysis it is determined that heartbeat of the driver becomes regular for a predetermined time. Also this provides an indication that the driver is about to fall asleep. If the specific physiological state is met, at 712 an alert is controlled to be issued. The alert may comprise one or more signals to alert the driver, for example, an audible alert, a vibrating alert with a steering wheel etc. If no detection is made at 710, the processing returns back to 704.

After issuing the alert, the processing may return back to 714 where the monitoring functionality is started again. In one embodiment, the monitoring functionality is continued as long as the navigation application is active. In another embodiment, the monitoring functionality is continued as long as the vehicle moves or exceeds a predetermined speed threshold.

Although the embodiments illustrated above have discussed a millimeter wave wireless communication transceiver, in another embodiment it is possible to use a separate millimeter wave wireless communication receiver and transmitter for achieving the same purpose.

At least some of the embodiments illustrated above enable a solution in which existing wireless communication device elements can be used to determine a physiological state relating to a user. Further, at least some of embodiments illustrated above enable a solution where driver drowsiness detection may be provided by a wireless communication apparatus of a user or by a wireless radio module integrated with a driver information system of a vehicle. Further, at least some of the embodiments illustrated above enable remote monitoring of a patient.

Any combination of the following examples is within the scope of the disclosure.

According to an aspect, there is provided a wireless radio module comprising a millimeter wave wireless communication transceiver configured to output radar signals for physiological measurement, a millimeter wave antenna array connected to the millimeter wave wireless communication transceiver and configured to transmit the radar signals and to receive reflected radar signals, and a processing unit configured to analyze the received reflected radar signals to determine changes in a spectrum reflecting at least one of heart rate or respiration.

In one embodiment, the millimeter wave antenna array comprises at least one antenna element for transmission and at least one antenna element for reception.

In one embodiment, alternatively or in addition, the wireless radio module further comprises a circulator configured to enable both transmission and reception with the millimeter wave antenna array.

In one embodiment, alternatively or in addition, the wireless radio module further comprises a control unit configured to provide electronic antenna beam control for the millimeter wave antenna array.

In one embodiment, alternatively or in addition, the control unit is configured to configure the antenna beam towards detected heart beat and/or respiration.

In one embodiment, alternatively or in addition, the wireless radio module is a 60 Ghz wireless connectivity radio module.

In one embodiment, alternatively or in addition, the wireless radio module is an automotive radar module.

According to another aspect, there is provided a wireless communication apparatus comprising a wireless radio module comprising a millimeter wave wireless communication transceiver configured to output radar signals for physiological measurement and a millimeter wave antenna array connected to the millimeter wave wireless communication transceiver and configured to transmit the radar signals and to receive reflected radar signals; and a processing unit configured to analyze the received reflected radar signals to determine changes in a spectrum reflecting at least one of heart rate or respiration.

In one embodiment, the wireless radio module further comprises a control unit configured to provide electronic antenna beam control for the millimeter wave antenna array.

In one embodiment, alternatively or in addition, the control unit is configured to configure the antenna beam towards detected heart beat and/or respiration.

In one embodiment, alternatively or in addition, the processing unit is configured to initiate output of the radar signals when detecting activation of a navigation application executed by the wireless communication apparatus.

In one embodiment, alternatively or in addition, the processing unit is configured to determine based on the analysis that breathing of a user slows down for a predetermined time, and issue an alert.

In one embodiment, alternatively or in addition, the processing unit is configured to determine based on the analysis that heartbeat of a user becomes regular for a predetermined time, and issue an alert.

In one embodiment, alternatively or in addition, the wireless radio module is a 60 Ghz wireless connectivity radio module.

According to another aspect, there is provided a vehicle comprising a millimeter wave wireless communication transceiver configured to output radar signals for physiological measurement, a millimeter wave antenna array connected to the millimeter wave wireless communication transceiver and configured to transmit the radar signals and to receive reflected radar signals, and a processing unit configured to analyze the received reflected radar signals to determine changes in a spectrum reflecting at least one of heart rate or respiration, to determine based on the analysis that a physiological state relating to a driver of the vehicle fulfills at least one alert triggering condition, and to cause initiation of an alert.

In one embodiment, the millimeter wave antenna array comprises at least one antenna element for transmission and at least one antenna element for reception.

In one embodiment, alternatively or in addition, the vehicle further comprises a circulator configured to enable both transmission and reception with the millimeter wave antenna array.

In one embodiment, alternatively or in addition, the processing unit is configured to initiate output of the radar signals when detecting activation of a navigation application.

In one embodiment, alternatively or in addition, the at least one alert triggering condition comprises determining that breathing of the driver slows down for a predetermined time.

In one embodiment, alternatively or in addition, the at least one alert triggering condition comprises determining that heartbeat of the driver becomes regular for a predetermined time.

According to another aspect, there is provided a method comprising controlling a millimeter wave wireless communication transceiver to output radar signals for physiological measurement with a millimeter wave antenna array, receiving reflected radar signals from a millimeter wave antenna array connected to the millimeter wave wireless communication transceiver and being configured to transmit the radar signals, and analyzing the received reflected radar signals to determine changes in a spectrum reflecting at least one of heart rate or respiration of a user.

According to another aspect, there is provided a computer program comprising program code, which when executed by at least one processor, causes an apparatus to control a millimeter wave wireless communication transceiver to output radar signals for physiological measurement with a millimeter wave antenna array, receive reflected radar signals from a millimeter wave antenna array connected to the millimeter wave wireless communication transceiver and being configured to transmit the radar signals, and analyze the received reflected radar signals to determine changes in a spectrum reflecting at least one of heart rate or respiration of a user.

According to another aspect, there is provided a computer-readable medium comprising a computer program comprising program code, which when executed by at least one processor, causes an apparatus to control a millimeter wave wireless communication transceiver to output radar signals for physiological measurement with a millimeter wave antenna array, receive reflected radar signals from a millimeter wave antenna array connected to the millimeter wave wireless communication transceiver and being configured to transmit the radar signals, and analyze the received reflected radar signals to determine changes in a spectrum reflecting at least one of heart rate or respiration of a user.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include disks, thumb drives, memory etc. and do not include propagated signals. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A wireless radio module comprising:
   a millimeter wave wireless communication transceiver configured to output radar signals for physiological measurement;
   a millimeter wave antenna array connected to the millimeter wave wireless communication transceiver and configured to transmit the radar signals and to receive reflected radar signals; and
   a processing unit configured to analyze the received reflected radar signals to determine changes in a spectrum reflecting at least one of heart rate or respiration of the user, and to initiate output of the radar signals when detecting activation of a navigation application.

2. A wireless radio module of claim 1, wherein the millimeter wave antenna array comprises at least one antenna element for transmission and at least one antenna element for reception.

3. A wireless radio module of claim 1, further comprising a circulator configured to enable both transmission and reception with the millimeter wave antenna array.

4. A wireless radio module of claim 1, further comprising a control unit configured to provide electronic antenna beam control for the millimeter wave antenna array.

5. A wireless radio module of claim 4, wherein the control unit is configured to configure the antenna beam towards detected heart beat and/or respiration.

6. A wireless radio module of claim 1, wherein the wireless radio module is a 60 Ghz wireless connectivity module.

7. A wireless radio module of claim 1, wherein the wireless radio module is an automotive radar module.

8. A wireless communication apparatus comprising:
   a wireless radio module comprising a millimeter wave wireless communication transceiver configured to output radar signals for physiological measurement and a millimeter wave antenna array connected to the millimeter wave wireless communication transceiver and configured to transmit the radar signals and to receive reflected radar signals; and
   a processing unit configured to analyze the received reflected radar signals to determine changes in a spectrum reflecting at least one of heart rate or respiration of the user, and to initiate output of the radar signals when detecting activation of a navigation application executed by the wireless communication apparatus.

9. A wireless communication apparatus of claim 8, wherein the wireless radio module further comprises a control unit configured to provide electronic antenna beam control for the millimeter wave antenna array.

10. A wireless communication apparatus of claim 9, wherein the control unit is configured to configure the antenna beam towards detected heart beat and/or respiration.

11. A wireless communication apparatus of claim 8, wherein the processing unit is configured to:
    determine based on the analysis that breathing of the user slows down for a predetermined time; and
    issue an alert.

12. A wireless communication apparatus of claim 8, wherein the processing unit is configured to:
    determine based on the analysis that heartbeat of the user becomes regular for a predetermined time; and
    issue an alert.

13. A wireless communication apparatus of claim 8, wherein the wireless radio module is a 60 Ghz wireless connectivity radio module.

14. A wireless communication apparatus of claim 8, wherein the wireless radio module further comprises a circulator configured to enable both transmission and reception with the millimeter wave antenna array.

15. A wireless communication apparatus of claim 8, wherein the wireless radio module is an automotive radar module.

16. A vehicle comprising:
- a millimeter wave wireless communication transceiver configured to output radar signals for physiological measurement;
- a millimeter wave antenna array connected to the millimeter wave wireless communication transceiver and configured to transmit the radar signals and to receive reflected radar signals; and
- a processing unit configured to
  - initiate output of the radar signals when detecting activation of a navigation application;
  - analyze the received reflected radar signals to determine changes in a spectrum reflecting at least one of heart rate or respiration of the driver;
  - determine based on the analysis that a physiological state relating to the driver fulfills at least one alert triggering condition; and
  - cause initiation of an alert.

17. A vehicle of claim 16, wherein the millimeter wave antenna array comprises at least one antenna element for transmission and at least one antenna element for reception.

18. A vehicle of claim 16, further comprising a circulator configured to enable both transmission and reception with the millimeter wave antenna array.

19. A vehicle of claim 16, wherein the at least one alert triggering condition comprises determining that breathing of the driver slows down for a predetermined time.

20. A vehicle of claim 16, wherein the at least one alert triggering condition comprises determining that heartbeat of the driver becomes regular for a predetermined time.

* * * * *